United States Patent
Clarke et al.

(10) Patent No.: US 7,210,640 B2
(45) Date of Patent: May 1, 2007

(54) FUEL INJECTOR SPRAY ALTERATION THROUGH A MOVEABLE TIP SLEEVE

(75) Inventors: John M. Clarke, Chillicothe, IL (US); Kevin P. Duffy, East Peoria, IL (US); Ronald P. Maloney, Peoria, IL (US); Devin C. Tornow, Peoria, IL (US)

(73) Assignee: Caterpillar Inc, Peoria (IL)

( * ) Notice: Subject to any disclaimer, the term of this patent is extended or adjusted under 35 U.S.C. 154(b) by 565 days.

(21) Appl. No.: 10/012,868

(22) Filed: Nov. 30, 2001

(65) Prior Publication Data

US 2003/0085305 A1   May 8, 2003

(51) Int. Cl.
*B05B 1/26*   (2006.01)

(52) U.S. Cl. ............... 239/515; 239/507; 239/516; 239/533.12

(58) Field of Classification Search ............... 239/533.2–533.12, 505, 507, 513–515, 520, 239/518, 504, 516
See application file for complete search history.

(56) References Cited

U.S. PATENT DOCUMENTS

| 2,592,111 | A | * | 4/1952 | Bischof | 239/533.7 |
| 3,469,793 | A | * | 9/1969 | Guertler | 239/533.5 |
| 4,905,908 | A | * | 3/1990 | Sczomak | 239/533.12 |
| 4,993,643 | A | * | 2/1991 | Schechter et al. | 239/499 |
| 5,020,728 | A | * | 6/1991 | Linder et al. | 239/533.12 |
| 5,497,947 | A | * | 3/1996 | Potz et al. | 239/533.12 |
| 5,826,801 | A | * | 10/1998 | Kobayashi et al. | 239/533.4 |
| 6,186,419 | B1 | | 2/2001 | Kampmann et al. | |
| 6,340,017 | B1 | * | 1/2002 | Dick | 123/467 |
| 6,425,539 | B1 | * | 7/2002 | Boecking | 239/533.12 |

* cited by examiner

*Primary Examiner*—Christopher Kim
(74) *Attorney, Agent, or Firm*—Liell & McNeil

(57) ABSTRACT

An apparatus and method for multi-mode fuel injection is disclosed. A sleeve is disposed about a fuel injector tip movable between a first and second position and wherein the sleeve is capable of impinging the fuel spray as it enters into the combustion chamber. By impinging the fuel spray, different spray profiles or plumes can be obtained allowing the fuel injector to inject in different modes, including homogenous charge compression ignition.

17 Claims, 5 Drawing Sheets

Fig-4-

FUEL INJECTOR SPRAY ALTERATION THROUGH A MOVEABLE TIP SLEEVE

TECHNICAL FIELD

The present invention is directed to fuel injector nozzle assemblies and specifically to fuel injectors with dual mode capability.

BACKGROUND

Emission plays an important role in engine development. In particular, engine manufactures have learned that fuel injection plays a crucial role in determining the amount of emissions that an engine produces. Traditionally, a fuel injector would only operate in one mode of operation, injecting fuel towards the side of the cylinder when the piston approached top dead center. At this point, the compressed air is hot enough to cause combustion. However, engineers have learned that injecting in dual modes during the same engine cycle may substantially reduce the amount of the emissions created during the combustion process. Specifically, it has been learned that it is desirable to inject a small amount of fuel while the piston is near bottom dead center. As the piston moves closer to top dead center position, the fuel mixes with the air, as it is being compressed, to form a relatively lean homogeneous mixture. Traditional fuel injection also occurs near top dead center and combustion occurs as a result of the temperature of the compressed air. This process is commonly referred to as homogeneously charge compression ignition (HCCI).

The prior art has attempted to create dual mode injectors; however, improvement is still necessary for more viable dual mode operation. U.S. Pat. No. 6,186,419 B1, issued to Kampman et al., discloses an injector that is capable of injecting, in different modes based upon engine operating conditions. Specifically, a sleeve is disposed around a fuel injector that is capable of impinging the fuel spray as it is injected into the cylinder. By moving the sleeve up and down, the degree of impingement can be changed. At the fully retracted position, the injector injects towards the side of the cylinder without any impingement and at the fully advanced position, the injection spray is completely impinged and directed towards the bottom of the cylinder. However, in this patent, the sleeve is moved through a rack and pinion approach, and the sleeve is not capable of quickly transitioning between multiple modes during a single engine cycle. Further, the sleeve disposed around the injection tip provides only a vertical surface of impingement which limits the flexibility of the injector and limits the ability to achieve homogenous mixtures.

In other attempts to achieve dual mode operation, engine manufacturers have placed two fuel injector nozzles into a cylinder, each operating in a different mode. The first nozzle performs the initial homogenous charge injection, directed toward the bottom of the cylinder when the piston is near bottom dead center, and the second nozzle, with different orifice angles injects in the traditional fashion when the piston is near top dead center. Unfortunately, this approach requires numerous extra components, adding cost and taking up additional packaging space.

The present invention is directed to overcome one or more of the problems set forth above.

SUMMARY OF THE INVENTION

In one embodiment, a fuel injector tip has an inner surface and a outer surface and at least one orifice having an axis and being disposed within the injector tip and opening between the inner and outer surfaces. A sleeve has an angled portion and is disposed about the tip and is axially movable relative to the injector tip between a first position at which the orifice axis is free from intersection with the sleeve and a second position in which the orifice axis intersects the sleeve.

In another embodiment, a method of multi-mode fuel injection during an single engine cycle comprises: positioning an impingement sleeve having an angled portion and being disposed about a fuel injector tip at a first position to direct a fuel spray from the tip to a first cylinder position, injecting the first fuel spray, repositioning the sleeve to a second position to direct fuel spray from the tip to a second cylinder position, and injecting a second fuel spray.

In another embodiment, an injector tip has inner and outer surfaces and longitudinal axis. The tip also has at least one orifice having an axis wherein the orifice is disposed within the injector tip and opening at the inner and outer surfaces. A sleeve having an angled portion is disposed concentrically about the longitudinal axis of the tip and is axially movable relative to the injector tip between a first position and a second position, wherein the first and second positions are spread apart relative to the longitudinal axis.

Finally, in another embodiment, a fuel injector comprises an injector tip having an inner surface an outer surface and at least one orifice having an axis and being disposed within said injector tip and opening at the inner and outer surfaces. A sleeve having an angled portion and being disposed about said tip and being axially movable relative to said injector tip between a first position at which said sleeve is at a first predetermined retracted position relative to said orifice and a second position at which said sleeve is at a second predetermined advanced position at which said orifice act as intersects said sleeve.

DETAILED DESCRIPTION

Figure 1:
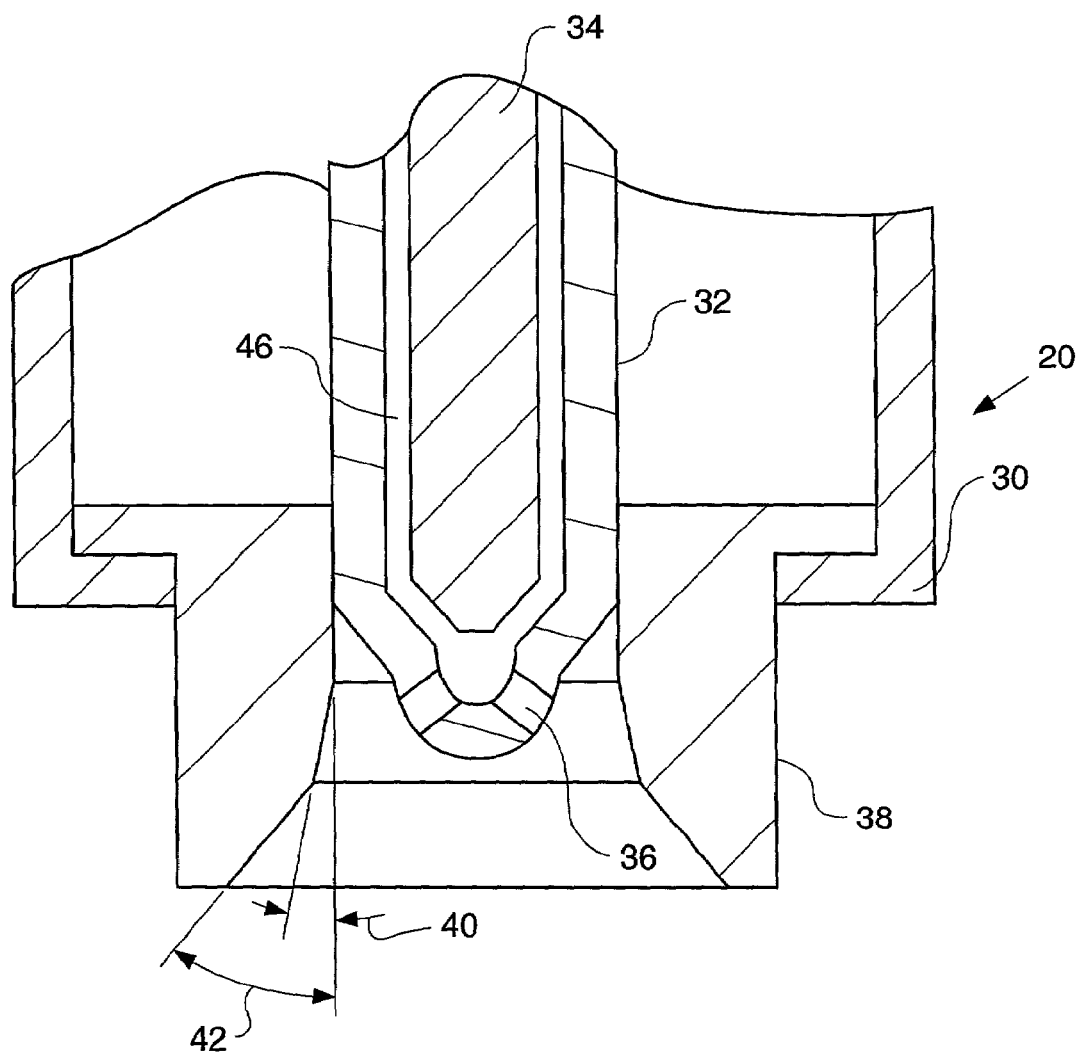
FIG. 1 is a diagrammatic cross section of an injector nozzle incorporating the present invention.

FIG. 1 is a diagrammatic cross section of an injector nozzle 20 incorporating the present invention. The injector nozzle includes an injector tip 32 having a blind bore which creates a fuel passage 46. At the lower end of the injector tip 32, there is at least one orifice 36 which allows fuel to communicate between the fuel passage 46, and the combustion cylinder (not shown). Within the injector tip 32, a check valve 34 is movable between an open position and a closed position thereby regulating fuel communication between fuel passage 46 and orifice 36.

The injector tip is at least partially enclosed by the injector's lower body 30. Further, a sleeve is disposed around the injector tip and slideable between a fully retracted position and a filly advanced position. The sleeve 38 is used to impinge fuel being injected through orifice 36.

Figure 2:
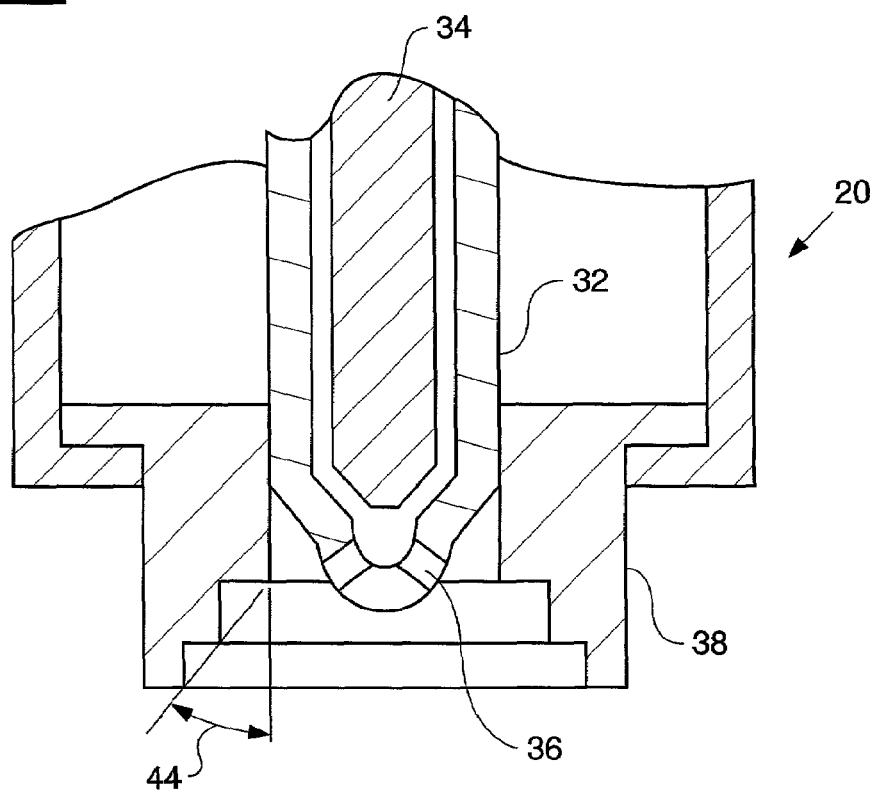
FIG. 2 is a diagrammatic cross section of an injector nozzle incorporating the present invention.

By impinging the spray, sleeve 38 can change the direction and shape of the spray plume that is created. The inner-diameter of the sleeve 38 is angled to allow different degrees of impingement. In FIG. 1, the inner-diameter of sleeve 38 is shown with two different angled surfaces. The first surface creates an angle α designated by 40 and the second angle creates an angle β designated by 42. In FIG. 2, a different variation of the sleeve 38 is shown. In FIG. 2, an angle θ, designated by 44, is illustrated through steps. In this particular case, the angle is measured as the line running through the points of each step. It is possible to create an "angle", using a curved surface. The curve is the tangent line at any single point on the curved surface.

FIGS. 1 and 2 illustrate sleeve 38 in the fully advanced position.

Figure 3:
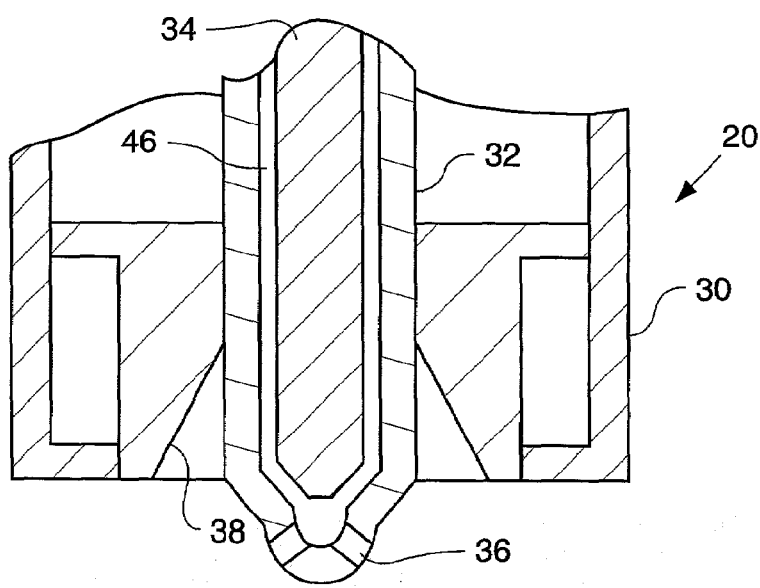
FIG. 3 is a diagrammatic cross section of an injector nozzle incorporating the present invention.

FIG. 3 illustrates sleeve 38 in a fully retracted position. It is possible for sleeve 38 to be stopped anywhere between its fully advanced and fully retracted positions, thereby changing the point of fuel impingement and therefore, the spray plume.

Figure 4:
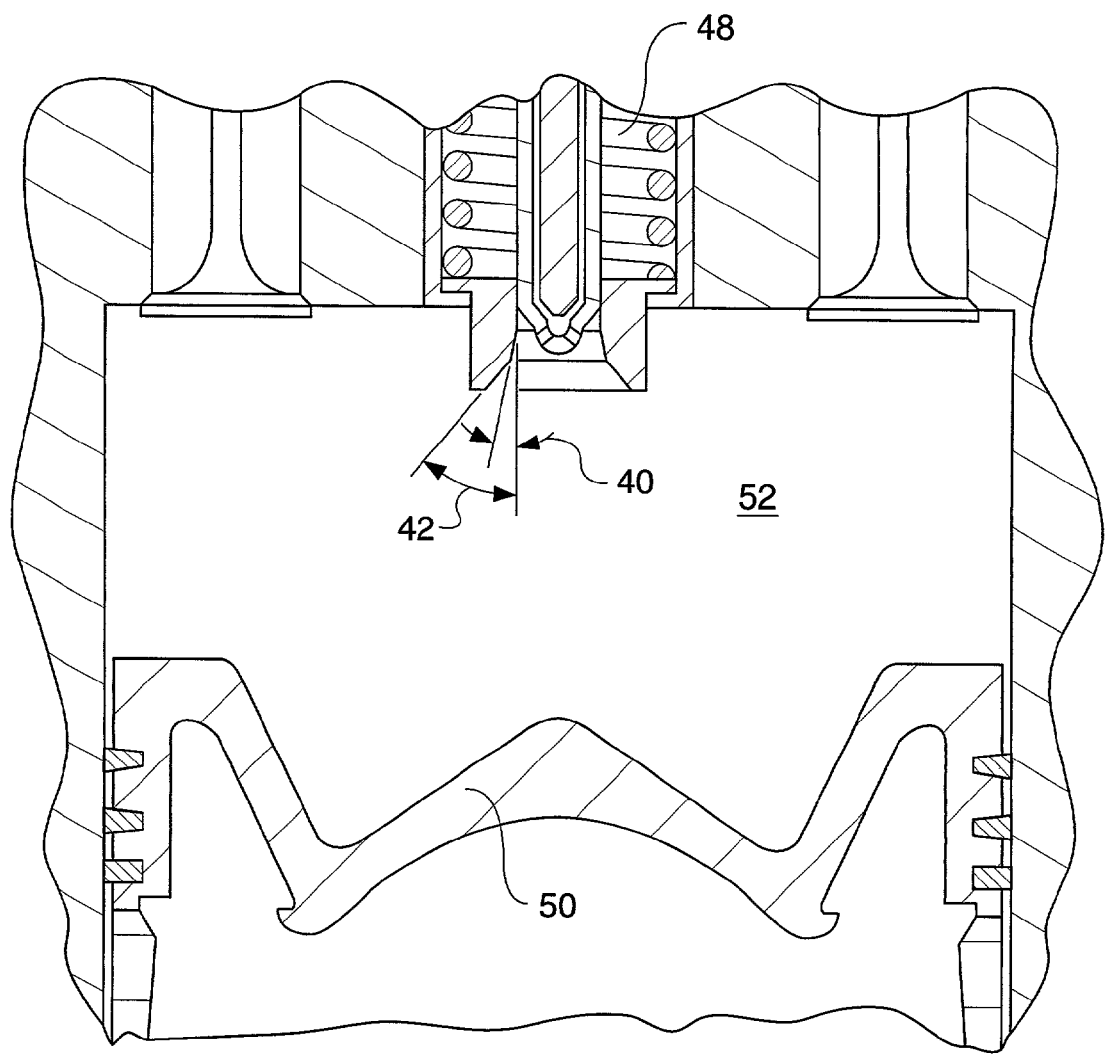
FIG. 4 is a diagrammatic cross section of an injector nozzle incorporating the present invention.

In FIG. 4, one embodiment of the present application is illustrated. Specifically, a passive control system is illustrated in which cylinder pressure controls the position of sleeve 38. Spring 48 provides a biasing force against sleeve 38 to place the sleeve in its fully advanced position. As the piston 50 compresses air in cylinder 52, cylinder pressure increases and causes the sleeve 38 to push against spring 48 and move upwards. When the piston 50 is near top dead center, sleeve 38 is in its fully retracted position. After, the piston 50 reaches top dead center, and moves back down, cylinder pressure is reduced and sleeve 38 also moves back down as the spring 48 strength becomes greater than the cylinder pressure.

Figure 5:
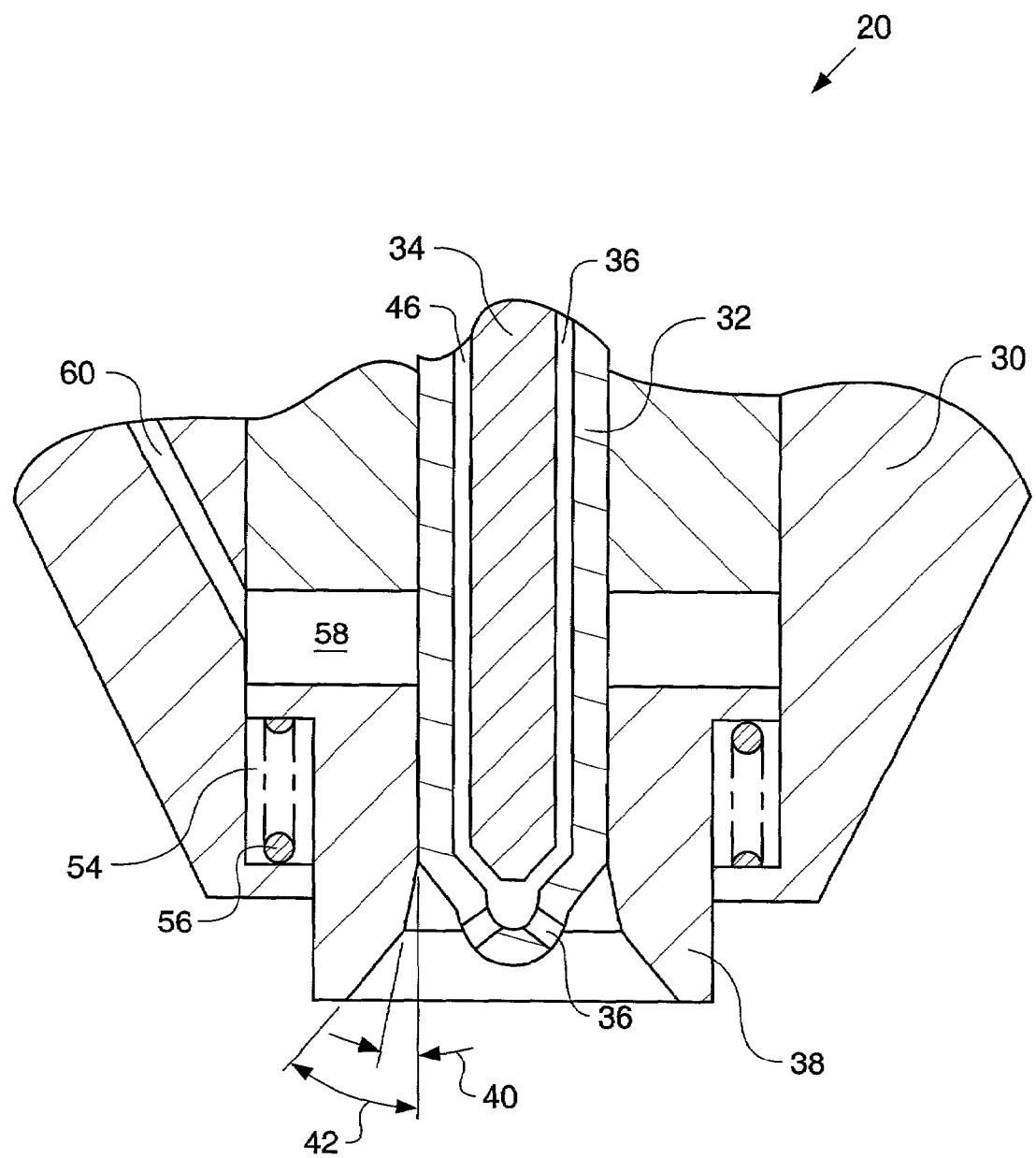
FIG. 5 is a diagrammatic cross section of an injector nozzle incorporating the present invention.
Figure 6:
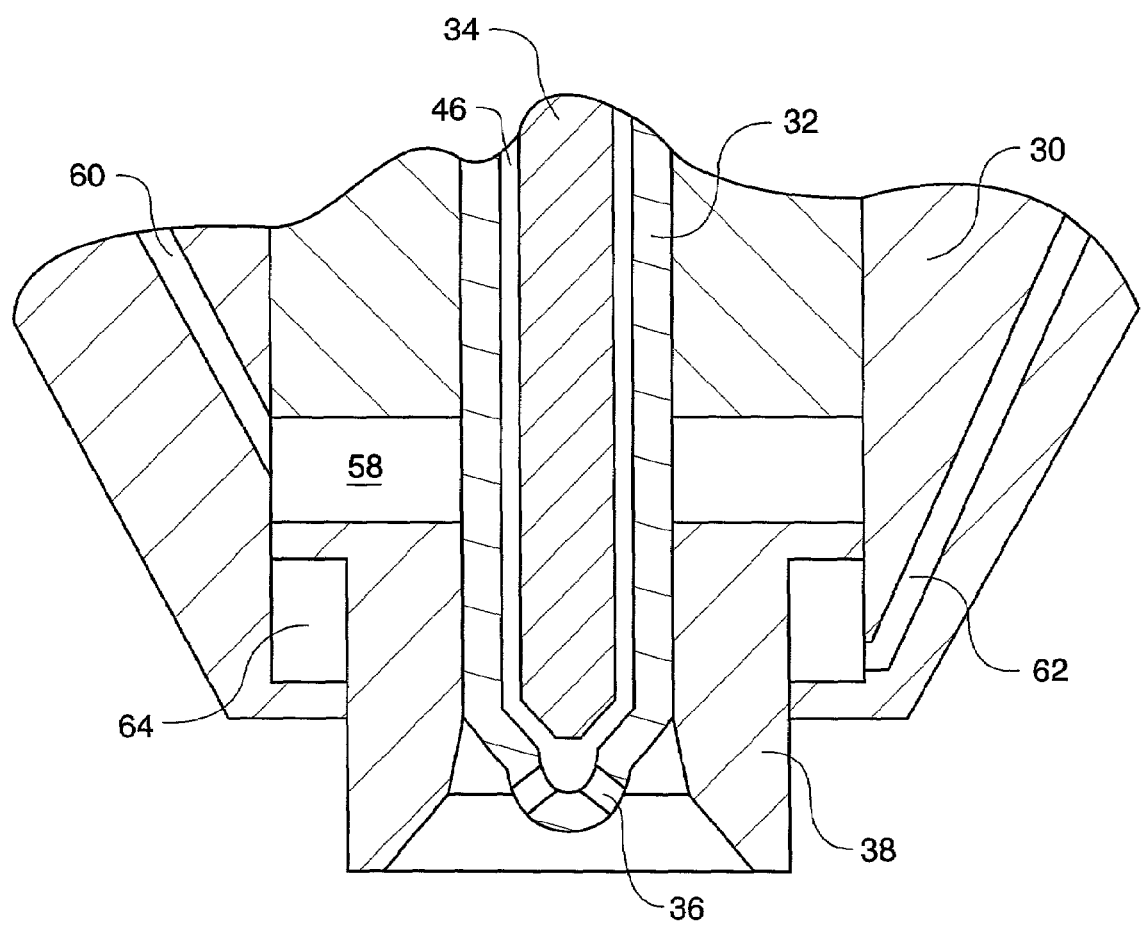
FIG. 6 is a diagrammatic cross section of an injector nozzle incorporating the present invention.

In FIGS. 5 and 6, additional embodiments of the present application are illustrated, specifically incorporating active control of sleeve 38. In FIG. 5, sleeve 38 is biased in the retracted position by a hydraulic bias spring 56. The spring 56 is located in spring cavity 54. Sleeve 38 is moved to the advanced position by introducing pressurized fluid into control cavity 58, through fluid passage 60. As pressure builds in control cavity 58, the sleeve is pushed downward, into its advanced position, against spring 56. When it is desired to return sleeve 38 to its retracted position, control cavity 58 is vented, releasing the pressure in control cavity 58 and allowing the spring 56 to return sleeve 38 to its retracted position. It should be noted that although FIG. 5 illustrates spring 56 biasing sleeve 38 in the retracted position, the design could be altered such that the spring 56 biased sleeve 38 in the advanced position and that pressurized fluid was used to move the sleeve upwards into its retracted position.

In FIG. 6, sleeve 38 is completely hydraulically controlled. Once again pressurized fluid from fluid passage 60 can work on the top of sleeve 38 through control cavity 58 however, a second control cavity 64, fed with pressurized fluid from second fluid passage 62 acts on the underside of sleeve 38. Depending upon the desired position of sleeve 38, pressurized fluid is either introduced into or, vented from the control cavity's 58 and 64. It should be noted that a variety of pressurized fluids could be used in control cavities 58 and 64 including oil, fuel, air, and water.

As it can be seen from FIGS. 5 and 6, the sleeves 38 position can be infinitely varied by controlling the flow of pressurized fluid into control cavities 58 and 64. It should also be noted that control of pressurized fluid flowing into the control cavity's 58 and 64 through fluid passages 60 and 62 is well known in the art and need not be described here however, for example only, a solenoid controlled valve could be used to regulate pressurized fuel flowing into and out of control cavities 58 and 64.

In the descriptions, it should be noted that fully advanced and fully retracted position are discussed and that these forms could have various meanings depending on the application. In order to define these terms, in another manner, the orifice 36 of tip 32 has an axis. In the advanced position, the orifice axis intersects the sleeve 38. In the retracted position, the orifice axis preferably is free form intersecting the sleeve 38 but this is not necessary. The sleeve 38 only needs to be retracted enough to avoid contacting the piston and providing an impinged spray plume that avoids putting fuel on the piston or cylinder walls.

INDUSTRIAL APPLICABILITY

Sleeve 38 allows a fuel injector to inject in multiple modes during the same engine cycle. In its most basic operation, the sleeve 38 helps control the fuel spray plume being injected into the cylinder 52. For example, a homogenous charge for compression ignition is desirable to reduce emissions. To achieve a homogenous charge, fuel needs to be injected toward the bottom of the cylinder 52 when the piston 50 is near bottom dead center; however injectors generally are designed to inject towards the side of the cylinder 52 when the piston is near top dead center. Sleeve 38 can be used to impinge the fuel spray and direct the spray plume towards the bottom of the cylinder 52.

High-pressure fuel is provided through fuel passage 46. Check 34 controls when the fuel is injected into cylinder 50. (Check 34 can be controlled in a variety of ways including direct control, such as with a solenoid or piezo). The Sleeve 38 can have any rest or start position but must be moveable between its advanced and retracted positions based upon fuel injection needs. To obtain the homogenous charge, the sleeve 38 needs to be placed in a position, preferably fully advanced, that directs the fuel spray plume toward the bottom of the cylinder 52. When injection is desired, check 34 opens the communication between fuel passage 46 and orifice 36. As the fuel is injected into the cylinder 52, it hits sleeve 38 and is redirected towards the bottom of the cylinder 52. As piston 50 moves up and compresses the air/fuel mixture, a homogenous charge is obtained. When the piston 50 is near top dead center, another traditional injection can occur by moving the sleeve 38 to its retracted position and again moving check 34 to allow injection. The injector has now injected in two modes during one engine cycle.

It is necessary to move sleeve 38 and inject in different modes to; 1) obtain proper homogenous mixing and 2) avoiding unnecessary emissions by spraying fuel on the cylinder walls (normal injection when the piston 50 is near bottom dead center) or spraying the piston 50 (by directing the spray down when the piston is near top dead center). It should be noted that the nozzle 20 can inject in numerous modes, besides just the two outlined above. The sleeve 38 can be positioned anywhere between the fully advanced and fully retracted positions to achieve different plume shape and direction based upon the sleeve's 38 angle. As illustrated in FIGS. 1 and 2 the sleeve 38 can have multiple angles or shapes to provide a variety of injection characteristics depending on where sleeve 38 impinges the injected fuel.

Control of sleeve 38 can be achieved in a variety of ways. In one embodiment of the present application, a passive control system is used, as illustrated in FIG. 4. The sleeve 38 is placed in it fully advanced position by a spring 48 when cylinder pressure is low (when piston 50 is near bottom dead center). As combustion pressure increases the pressure pushes sleeve 38 upwards, compressing spring 48. When the piston 50 reaches top dead center, sleeve 38 is in a retracted position. As the piston moves back down, cylinder pressure is reduced and the spring 48 again pushes sleeve 38 down to an advanced position. With this type of control system, injection may be based upon piston position, which has a relationship to cylinder pressure and therefore sleeve 38 position. For example, when operating in a HCCI mode, a first injection would be made when the sleeve 38 is in an advanced or down position. Check 34 would open communication between fuel passage 46 and orifice 36, allowing fuel to spray into cylinder 52. (NOTE—Varied methods of check 34 control are well known in the art and are not discussed here.) With cylinder pressure low, spring 48 has biased sleeve 38 in the advanced position causing fuel to contact sleeve 38 on its first angled position, forming angle α 40. This causes the fuel spray to be directed toward the bottom of the cylinder 52. This injection is then stopped by closing check 34. As the piston 50 advances, and builds cylinder pressure, the initial injection creates a homogeneous charge in cylinder 52. As cylinder pressure builds, pressure becomes greater than spring's 48 strength, causing sleeve 38 to retract or move up. This allows for two things, first, sleeve 38 may need to retract to avoid contacting piston 50 when it reaches top dead center. Second, when sleeve 38 retracts, other injection profiles can be obtained. It is describe to inject again when the piston 50 is near top dead center by again moving check 34. Depending on the timing of the injection, the fuel spray could impinge sleeve 38 on the second angle position, forming angle β 42, or the sleeve 38 could be completely retracted and the injection may not be impinged sleeve at all. With the sleeve 38 moving with the piston 50, it is possible to obtain various injection profiles based upon the timing of the injection event and the number of different angles on sleeve 38.

Another alternative embodiment, an active control system can be for sleeve 38 can be implemented. In FIG. 5, a hydraulic bias spring 56 and pressurized fluid are used to control the position of sleeve 38. Specifically, spring 56, located in spring cavity 54 can biases sleeve 38 in the retracted position. In order to perform HCCI operation, pressurized fluid is introduced to fluid passage 60 and subsequently control cavity 58. As pressure builds in control cavity 58, sleeve 38 is pushed down into in its advanced position against biases spring 56. Check 34 would then open communication between fuel passage 46 and orifice 36 allowing the fuel spray to impinge sleeve 38 and be directed toward the bottom of cylinder 52. Check 34 would then be closed and fluid pressure from control cavity 58 would be vented to allow sleeve 38 to move to its retracted position as piston 50 advances. A second injection could occur while sleeve 38 is advancing or when sleeve 38 reaches is fully retracted position. In fact multiple injections could occur whenever desired as sleeve 38 is moved towards its retracted position. By retracting sleeve 38 and continuing to have multiple injections, different injection profiles can be obtained depending upon the angle of sleeve 38 that fuel spray impinges upon. As sleeve 38 comes closer to its fully retracted position the fuel spray is directed less to the bottom of the cylinder and more towards the side until finally sleeve 38 is fully retracted and unimpinged fuel spray can be obtained.

In yet another embodiment of an active control system for sleeve 38, FIG. 6 illustrates a fully hydraulic control system. Injection occurs in the same primary way by impinging the fuel spray along the different angles of sleeve 38 however control of sleeve 38 is slightly different. In this embodiment, hydraulic fluid in control cavity 58 and control cavity 64 positions sleeve 38. The control cavity 58 receives pressurized fluid from fluid passage 60 and control cavity 64 receives pressurized fluid from fluid passage 62. When its desirable to have the sleeve 38 in its advanced position, fluid pressure is allowed build in control cavity 58 and at the same time, pressurized fluid is vented from the second control cavity 64. In just the opposite scenario, when it is desirable to have sleeve 38 in its retracted position, pressurized fluid is directed into the second control cavity 64 and vented from control cavity 58. If it is desirable to have a intermediate position, sleeve 38 could be pressure balanced by putting pressurized fluid in both control cavities 58 and 64.

Other aspects, features, advantages of the present application may be obtained from a study of this disclosure and drawings, along with the appended claims.

What is claimed is:

1. A fuel injector comprising:
   an injector tip having an inner surface and an outer surface;
   at least one orifice having an axis and being disposed within said injector tip and opening at the inner and outer surfaces;
   a check positioned to move inside the injector tip to open and close said at least one orifice;
   a sleeve having an inner-diameter angled portion, and being disposed about said tip, said sleeve being movable axially relative to said injector tip between a first position at which said orifice axis is free from intersection with said sleeve and a second position at which said orifice axis intersects said sleeve; and
   a spring positioned to provide a biasing force against the sleeve.

2. The fuel injector of claim 1 wherein said inner-diameter angled portion comprises of a plurality of angled surfaces to allow different degrees of spray impingement.

3. The fuel injector of claim 1 wherein said inner-diameter angled portion comprises of a plurality of steps, wherein each of said steps corresponds to a different degree of spray impingement.

4. The fuel injector of claim 1 wherein said inner-diameter angled portion comprises a curved surface.

5. The fuel injector of claim 1 wherein said sleeve is moveable between said first position and said second position during one engine cycle.

6. A fuel injector comprising:
   an injector tip having an inner surface and an outer surface;
   an at least one orifice having an axis and being disposed within said injector tip and opening at the inner and outer surfaces;
   a sleeve having an inner-diameter angled portion, and being disposed about said tip, said sleeve being movable axially relative to said injector tip between a first position at which said orifice axis is free from intersection with said sleeve and a second position at which said orifice axis intersects said sleeve;
   a spring positioned to provide a biasing force against the sleeve;
   a check valve slideably disposed within said tip;
   a fuel passage; and
   the spring biases the sleeve toward the second position.

7. The fuel injector of claim 6 wherein said check valve is an inwardly opening check valve which controls fluid communication between said fuel passage and said orifice.

8. The fuel injector of claim 1 wherein said sleeve is pushed against the action of the spring by fluid pressure acting on the sleeve.

9. The fuel injector of claim 1 including a lower body that is a stop for said sleeve.

10. The fuel injector of claim 1 wherein said orifice axis intersects said inner-diameter angled portion of said sleeve when said sleeve is in said second position.

11. A fuel injector comprising:
an injector tip having an inner surface and an outer surface and a longitudinal axis;
at least one orifice having an axis and being disposed within said injector tip and opening at the inner and outer surfaces;
a check positioned to move inside the injector tip to open and close said at least one orifice;
a sleeve having a first inner diameter defining a first fuel spray plume, and at least a second inner diameter larger than said first inner diameter and defining at least a second fuel spray plume different from said first plume, said sleeve being disposed concentrically about said longitudinal axis of said tip, said sleeve being movable axially relative to said injector tip between a first position and a second position, said first and second positions being spread apart relative to said longitudinal axis; and
a spring positioned to provide a biasing fore against the sleeve.

12. The fuel injector of claim 11 wherein said first and second positions correspond with said first and second fuel spray plumes, respectively.

13. The fuel injector of claim 12 wherein said orifice axis intersects said sleeve when said sleeve is at said second position and does not intersect said sleeve when said sleeve is at said first position.

14. The fuel injector of claim 11 wherein said second position is a position at which said orifice axis intersects said sleeve.

15. A fuel injector comprising:
an injector tip having an inner surface and an outer surface;
an at least one orifice having an axis and being disposed within said injector tip and opening at the inner and outer surfaces;
a check positioned to move inside the injector tip to open and close said at least one orifice;
a sleeve having an angled portion and being disposed about said tip, said sleeve being movable axially relative to said injector tip between a first position at which said sleeve is at a first predetermined retracted position relative to said orifice and a second position at which said sleeve is at a second predetermined advanced position at which said orifice axis intersects said sleeve; and
a spring biasing said sleeve toward one of said first and second positions.

16. The fuel injector of claim 15 wherein said orifice axis intersects said sleeve at said first position, said sleeve being further movable to a third position at which said orifice axis is free from intersection with said sleeve.

17. The fuel injector of claim 15 further comprising a lower body, wherein said spring is disposed between said sleeve and said lower body.

\* \* \* \* \*